United States Patent [19]
Bridgelall

[11] Patent Number: 5,914,478
[45] Date of Patent: Jun. 22, 1999

[54] SCANNING SYSTEM AND METHOD OF OPERATION WITH INTELLIGENT AUTOMATIC GAIN CONTROL

[75] Inventor: Raj Bridgelall, Mount Sinai, N.Y.

[73] Assignee: Symbol Technologies, Inc., Holtsville, N.Y.

[21] Appl. No.: 08/787,727

[22] Filed: Jan. 24, 1997

[51] Int. Cl.$^6$ .............................. G06K 7/10; G06K 7/12
[52] U.S. Cl. ............. 235/462.25; 235/454; 235/462.29; 235/472.02
[58] Field of Search .................................... 235/454, 462, 235/472, 463, 494, 472.02, 462.01, 462.16, 462.25, 462.29

[56] References Cited

U.S. PATENT DOCUMENTS

| | | | |
|---|---|---|---|
| 5,073,954 | 12/1991 | Van Tyne et al. | 235/463 |
| 5,168,148 | 12/1992 | Giebel | 235/462 |
| 5,288,983 | 2/1994 | Nakazawa | 235/462 |
| 5,298,728 | 3/1994 | Elliot et al. | 235/463 |
| 5,537,483 | 7/1996 | Stapleton et al. | 382/309 |
| 5,545,888 | 8/1996 | Barkan et al. | 235/462 |
| 5,581,072 | 12/1996 | Bridgelall et al. | 235/462 |
| 5,612,529 | 3/1997 | Coleman | 235/455 |
| 5,677,523 | 10/1997 | Coleman | 235/455 |
| 5,734,152 | 3/1998 | Gore et al. | 235/462 |

Primary Examiner—Donald Hajec
Assistant Examiner—Daniel St. Cyr

[57] ABSTRACT

A bar code scanner and method of operation includes intelligent AGC to maintain a constant signal level while not delaying a decoder in identifying indicia when noise or specular reflection occurs during a scan period. A light detector receives light and generates an analog signal representative of the scanned indicia. The analog signal is provided to a pre-amplifier which provides a first output to a digital voltage controlled amplifier and a second output to an intelligent AGC circuit which controls the amplifier. The amplifier output is provided through filters to a decoder for detecting the indicia scanned by the light source. The intelligent AGC circuit includes a first path for determining the occurrence of a specular or glitch noise in the analog signal. A second path derives the overall signal strength using first derivative of the analog signal which is immune to low frequency noise and ambient light. By taking the mean and variance of the signal strength, a programmable processor is able to set the gain for the digital voltage control amplifier in the next scan. A short, predetermined time before a Start-Of-Scan signal, the processor calculates the signal strength. Since the signal strength does not change rapidly between scans, the gain of the next scan will be based on the signal scan. A fixed signal gain throughout the entire scan prevents gain modulation at frequencies lower than the time constant of the signal strength indicator, and is more tolerant to noise from ambient light and other low frequency noise sources.

10 Claims, 6 Drawing Sheets

SCANNING SYSTEM AND METHOD OF OPERATION WITH INTELLIGENT AUTOMATIC GAIN CONTROL

BACKGROUND OF THE INVENTION

1. Field of Invention

This invention relates to scanning systems and methods of operation. More particularly, this invention relates to bar code scanning systems including Automatic Gain Control (AGC) and methods of operation for such scanning systems.

2. Description of the Prior Art

Bar code scanners which utilize AGC for enhanced working range performance tend to slow down the decoding speed. The loss of aggressiveness is due to the standard AGC utilizing a slow time constant in order to track the overall signal strength. When events such as noise glitches or specular reflection set the signal strength up to a maximum value, subsequent valid bar code signals could be heavily attenuated while the signal strength output is slowly settling to a final value. During this period, valid bar code signals may be missed while the gain control of the AGC circuit settles to a final value after the specular reflection. The gain control circuit is implemented with peak detectors that have time constants optimized for one or more scan durations and slow changes in signal strength. When this signal is high, the gain of the signal is lowered and vice-versa. A specular reflection or noise glitch will quickly set the gain control signal to a maximum value. The signal will then begin to decay from the large value with respect to an optimum time constant for normal operation. This high value control signal sets the gain of the VCA too small for proper digitization of subsequent valid bar code signals.

Although the loss of decoding efficiency is noticeable in slower speed, single line "aim-and-shoot" scanners, a user may find acceptable the loss of decoding efficiency. However, for omni-directional scanners, the loss of decoding efficiency is much more severe. An "aim-and-shoot" single line scanner has more opportunities for a good decode than an omni-directional scanner. The single scan line is generally aimed directly at the bar code, whereas only a few scan lines of an omni-directional scan pattern will cross the bar code at any given time. Therefore, after a noise glitch or specular reflection, the omni-directional scanner cannot afford to miss valid bar code signals. The opportunity for an omnidirectional scanner to decode a bar code is relatively infrequent, as compared to a single line scanner operating at the same scan speed.

The following prior art patents are representative of scanning techniques which utilize AGC:

U.S. Pat. No. 5,168,148 to James R. Giebel, issued Dec. 1, 1992, and assigned to the assignee of the present invention, discloses an automatic gain control circuit for dynamically adjusting the gain of a receiver that is used to receive light reflected from a bar code. The AGC provides a fast adjustment to receiver gain so that the receiver can provide a decodable signal quickly. The AGC circuit in addition to sensing the final output of the receiver includes an additional feedback path from an amplifier in the receiver that is located before the final amplification stage. The additional feedback has a negligible attack time, and adjusts receiver gain quickly, thereby minimizing the time required to reach steady state.

U.S. Pat. No. 5,288,983 to A. Nakazawa, issued Feb. 22, 1994, discloses a symbol read device which is capable of reading symbols, regardless of their orientations, by scanning the symbols in different directions. The symbol read device includes a light beam emitter, a scanner which scans the light beam over different positions on a symbol surface having a symbol to be read, a detector which detects light reflected from the symbol surface and generates a detection signal indicative thereof, and a variable gain amplifier which amplifies the detection signal. An automatic gain controller which sets a gain of the variable gain amplifier scan line or scan line group in response to the detection signal. A scan position detector detects a scan position and a controller selects the gain set by the automatic gain controller based on an output signal of the scan position detector.

None of the prior art discloses an intelligent AGC system which uses a processor to maintain a constant gain throughout a single scan and maintain the output within the constant voltage window as the input signal strength changes from scan to scan. Nor does the prior art show a scanning system which is immune to noise and specular reflection that often severely degrades the decoding performance of omni-directional scanners that use an AGC circuit.

SUMMARY OF THE INVENTION

An object of the invention is an improved scanning system and method of operation using intelligent AGC.

Another object is a processor controlled AGC technique for single line, omni-directional scanning systems and methods of operation.

Another object is an AGC technique for a scanning system and method of operation which is immune to noise and specular reflection which degrades the decoding performance of single line and omni-directional scanners.

Another object is an AGC technique which maintains a consistent gain within a single scan and changes the gain if necessary prior to the next scan.

These and other objects, features and advantages are achieved in a bar code scanner and method of operation which includes AGC to maintain a constant signal level while not delaying a decoder in identifying indicia when noise or specular reflection occurs during a scan period. A light detector receives light reflected from the indicia during the scan period and in response thereto, generates an analog signal representative of the scanned indicia. The analog signal is provided to a pre-amplifier which provides a first output to a digital voltage controlled amplifier and a second output to an intelligent AGC circuit which controls the digital voltage controlled amplifier. The output of the digital controlled amplifier is provided through filters to a decoder for detecting the indicia scanned by the light source. The intelligent AGC circuit includes a first path for determining the occurrence of a specular or glitch noise in the analog signal. The first path includes an inverter responsive to the analog signal to provide an input to a comparator which compares the inverted analog signal with a specular or glitch threshold. The output of the comparator is provided to a 1-bit latch which provides an indication to a processor when a specular or glitch has occurred in the analog wave. The overall signal strength in the analog signal is derived in a derivative circuit which provides the first derivative of the analog signal. The output of the derivative circuit is provided to a rectifier. The peak heights of the rectified first derivative signal, which is immune to low frequency noise and ambient light, provides an indicator of the analog signal strength. By taking the mean and variance of the peak heights, a processor or programmable logic array is able to set the gain for the digital voltage control amplifier in the next scan. The beginning of a scan is normally flagged by a Start Of Scan (SOS) signal which is derived from a motor drive for the scanning system. A short, predetermined time before the SOS transition is used by the processor to calculate the signal strength. Since the signal strength does not change rapidly between scans, the gain of the next scan will be based on the signal scan. A fixed signal gain throughout the entire scan prevents gain modulation at frequencies lower than the time constant of the signal strength indicator, and is more tolerant to noise from ambient light and other low frequency noise sources.

When a noise glitch or specular reflection occurs, the pre-amplifier signal swings to a large negative voltage. The inverter changes this into a large positive voltage that is then compared to the threshold voltage. If the swing is greater than the specular reflection or glitch threshold, the latch will be set. The processor is now informed that a specular reflection or noise glitch has occurred. Since the current scan is already destroyed and rendered undecodable, the processor will wait for the rest of the scan to complete before resetting the latch. In addition, if a noise glitch or specular reflection is detected, the processor will not change the gain of the digital controlled amplifier. Since the processor calculates the signal strength from the part of the scan that is not affected by specular reflection or noise, the processor may reset the latch soon after the specular reflection is detected rather than wait until the current scan has been completed. If the latch was not restarted and the output of the comparator is still high, the specular reflection is still present. That is, the comparator has not yet changed state, and is still detecting on-going specular reflection or noise If the current scan is not yet completed, the latch has not been re-asserted and the comparator output is low, the partial remaining data may be used to calculate signal strength. Before the beginning of another scan, the comparator must be checked to confirm that the specular reflection from the previous scan is terminated. Otherwise, the specular reflection or noise is still on-going and only part of the scan data may be used.

DESCRIPTION OF DRAWING

The invention will be further understood from the following detailed description of a preferred embodiment taken in conjunction with the accompanying drawing, in which.

DESCRIPTION OF PREFERRED EMBODIMENT

Figure 1:
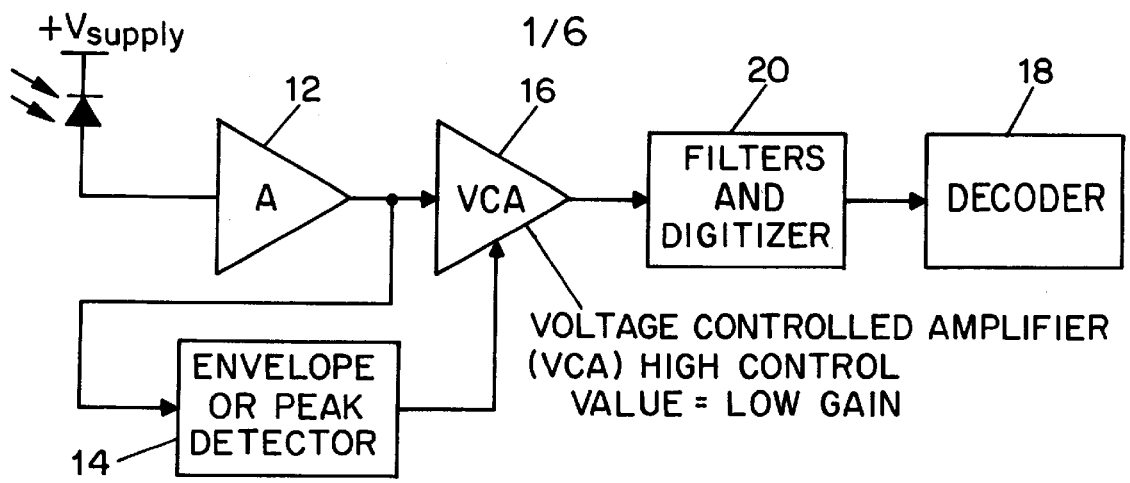
FIG. 1 is a circuit diagram of a prior art AGC system for bar code scanners.

In prior art bar code scanners, as shown in FIG. 1, a photodetector 10 responds to reflected light from a scanned object (not shown) and provides a barcode signal (See FIG. 3) from a single scan. The bar code signal is provided to a pre-amplifier 12, prior to envelope or peak detection in a detector 14. The detector output voltage or a filtered version directly controls a Voltage Control Amplifier (VCA) 16, the output of which is provided to a decoder 18 through filters and digitizer 20. The control input of the VCA is such that a high voltage signal produces a low gain and vice-versa. The detected bar code signal will also be modulated by slow changes in overall signal strength. This modulation can be severe in high ambient noise climates may contribute to failures of the decoder 18.

An ideal AGC system maintains the signal level to a detection circuit (digitizer) within a small voltage margin throughout the desired working distance of the scanner. This consistent signal level reduces the size, power consumption and costs of the edge detection circuitry and allows for more functionality. The edge detection circuitry may be optimized for best performance when the input signal is maintained within a small voltage margin. For example, between 0.8 and 1.4 volts.

Figure 3:
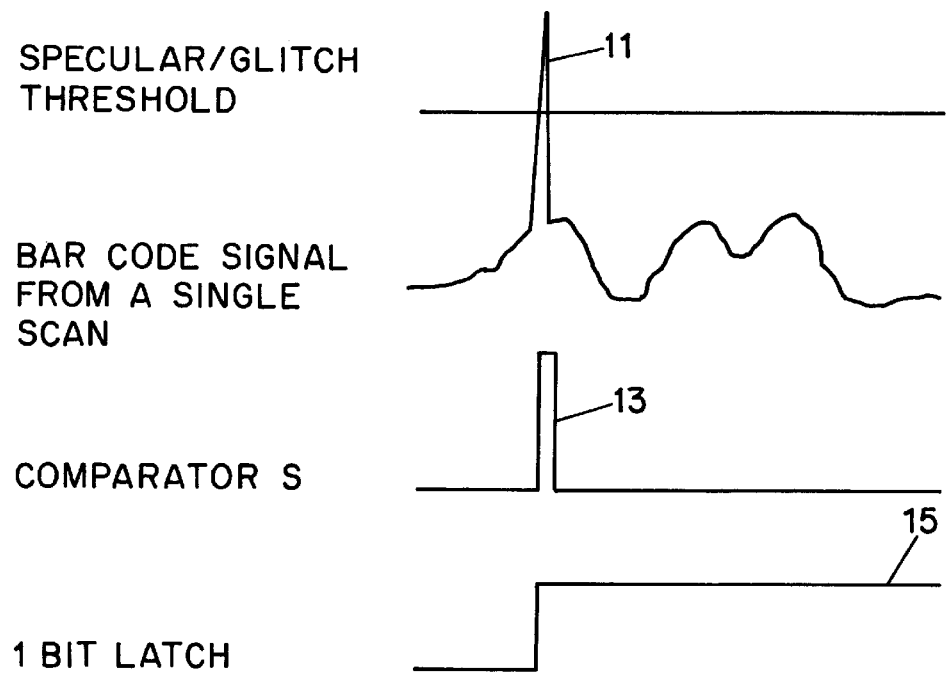
FIG. 3 are waveforms detected and generated in a specular reflection/glitch detection circuit included in the circuit of FIG. 2.
Figure 2:
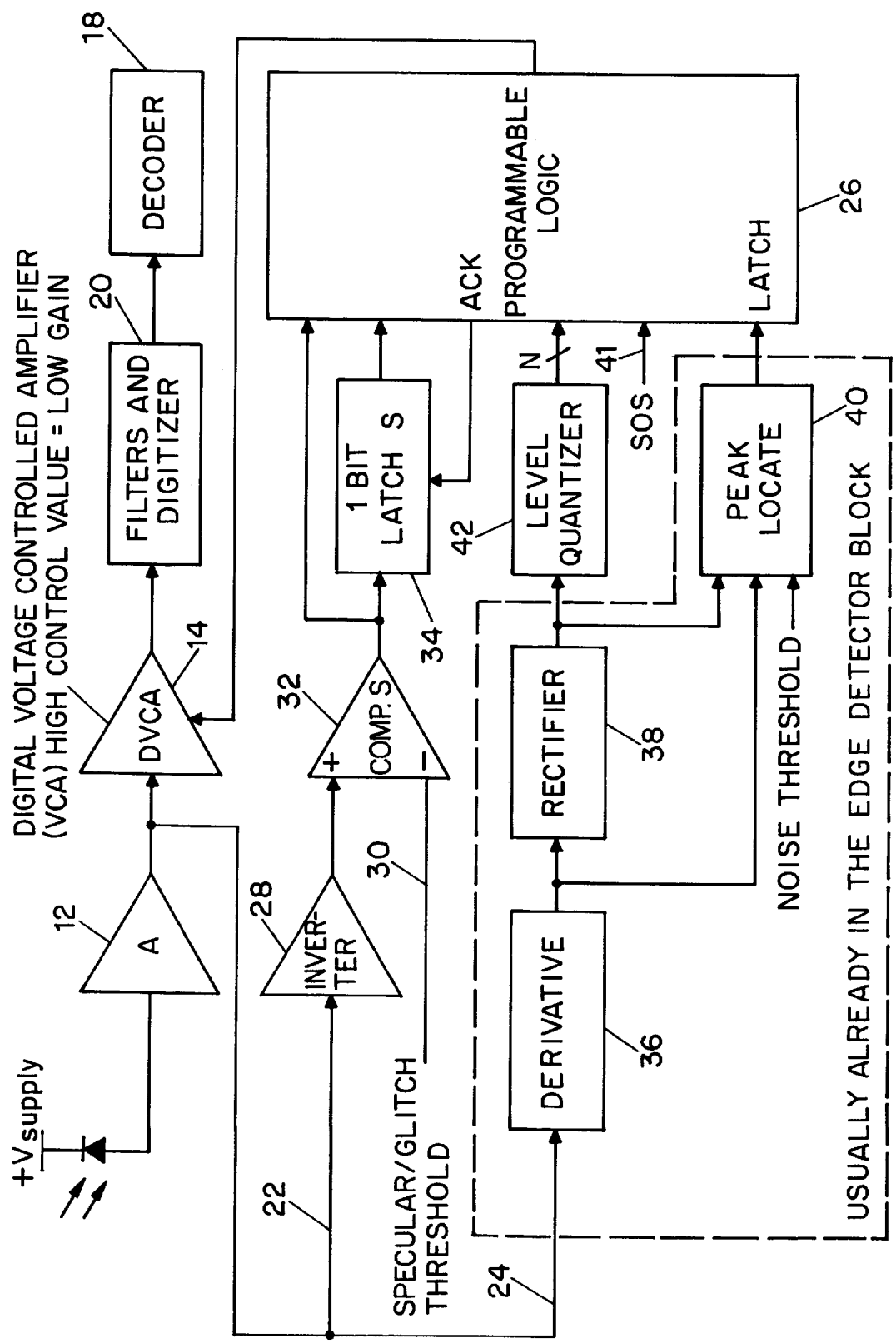
FIG. 2 is a circuit diagram of a scanning system including "smart" automatic gain control (AGC) and a method of operation which incorporates the principles of the present invention.

FIG. 2 solves the problem of the prior art. The envelope detector 14 in FIG. 1 is replaced in FIG. 2 by a first signal path 22 and a second signal path 24 coupled to a programmable logic unit 26. The first signal path detects the presence of a specular reflection or noise glitch in the bar code signal. As shown in FIG. 3, when a noise glitch or a specular reflection 11 occurs, the preamplifier 12 swings to a large negative voltage. An inverter 28 changes the large negative voltage into a large positive voltage 13 which is then compared with a specular or glitch threshold 30 in a comparator 32. When the large positive voltage is greater than the threshold voltage 30, a latch 34 will be set by a voltage level 15. The output of the latch is provided to a processor or programmable logic unit 26 and indicates that a specular reflection or noise glitch has occurred in the bar code signal. The presence of the specular reflection or noise glitch destroys and renders undecodable the current scan cycle which causes the processor 26 to wait for the remainder of the scan to complete before resetting the latch. In addition, if a noise glitch or specular reflection 11 is detected, the processor 26 will not change the gain of the VCA 16. Returning to FIG. 2, the second path 24 enables the processor 26 to derive the overall signal strength from features in the bar code signals. The most important feature of the bar code signal may be derived from a first derivative circuit 36 which provides an output to a rectifier 38 and a peak locating circuit 40. The output of the rectifier is provided to a level quantizer 42 and as a first input to the peak locator circuit 40. A second input to the locator 40 is provided by the derivative circuit 36. A third input to the circuit 40 is provided by a noise threshold. The peak heights of the full or half-wave rectified first derivative signal is a robust indicator of the bar code signal strength since it is immune to low frequency noise and ambient light. The processor 26 by taking the mean and variance of the peak output from the unit 40 as a signal strength indicator is able to set the gain of the next scan. The processor 26 may provide a coarse and/or a fine gain setting to the amplifier 14 using conventional circuitry well known in the art. Signal glitches and specular reflection may now be ignored by the processor which maintains the signal gain. The ability of the system to intelligently set its gain in real time speeds up response time and improves reading robustness. Additionally, no misdecodable code segments occur after signal surges from noise glitches or specular reflections.

Figure 4:
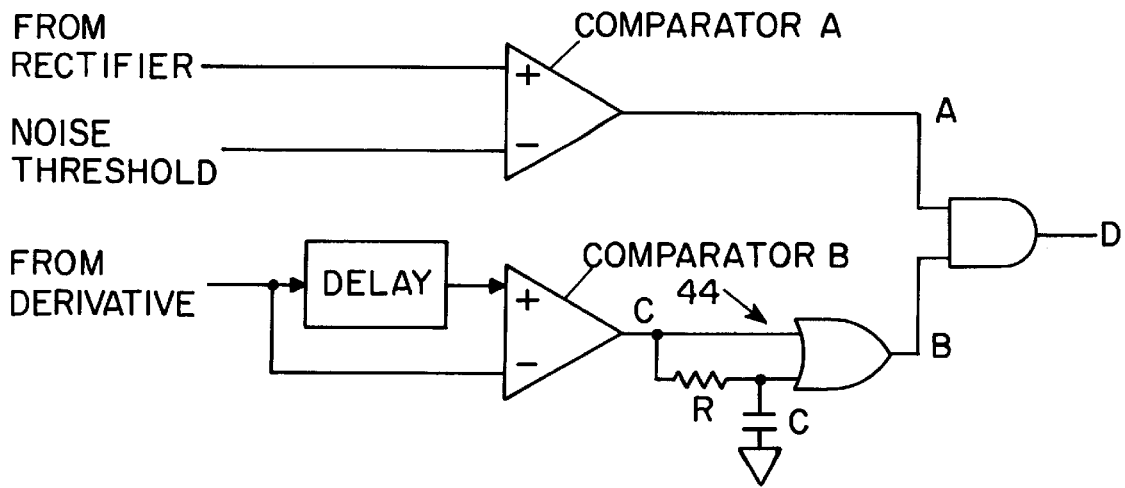
FIG. 4 is a peak locator circuit included in the circuit of FIG. 2.

In FIG. 4, the peak locator circuit 40 is shown in more detail and indicates the time position of the peak heights of the full or half-wave rectified first derivative signal to the processor 26. In FIG. 4, a comparator A receives the rectifier and non-threshold inputs and produces a high value only around the transitions corresponding to the peak heights of the full or half-wave rectified first derivative signal. The high value is controlled by the noise threshold input. The derivative signal is provided to a comparator B through a delay line as one input and directly provided to comparator B as a second input. The output of comparator B or point C will have transitions corresponding to the peak heights of the full or half-wave rectified first derivative signal plus other transitions due to noise and other signal crossing areas. Alternatively, zero crossings of a second derivative signal may be used to produce the same output. A pulse generator circuit 44, produces a pulse at each of these transitions and provides an output at point B. The generator 44 includes resistance (R) and capacitance (C) values which can be adjusted such that the transitions corresponding to the peak heights of the full or half-wave rectified first derivative signal are all detected. The comparator A and pulse generator B outputs are provided to a logic circuit 46 such that the output pulses at point D correspond to the time locations of the peak heights of the full or half-wave rectified derivative signal. Alternatively, if the output of the circuit 44 is provided to the digitizer 20 (see FIG. 2, then the signal at point D is readily available and need not be reproduced.

Figure 5:
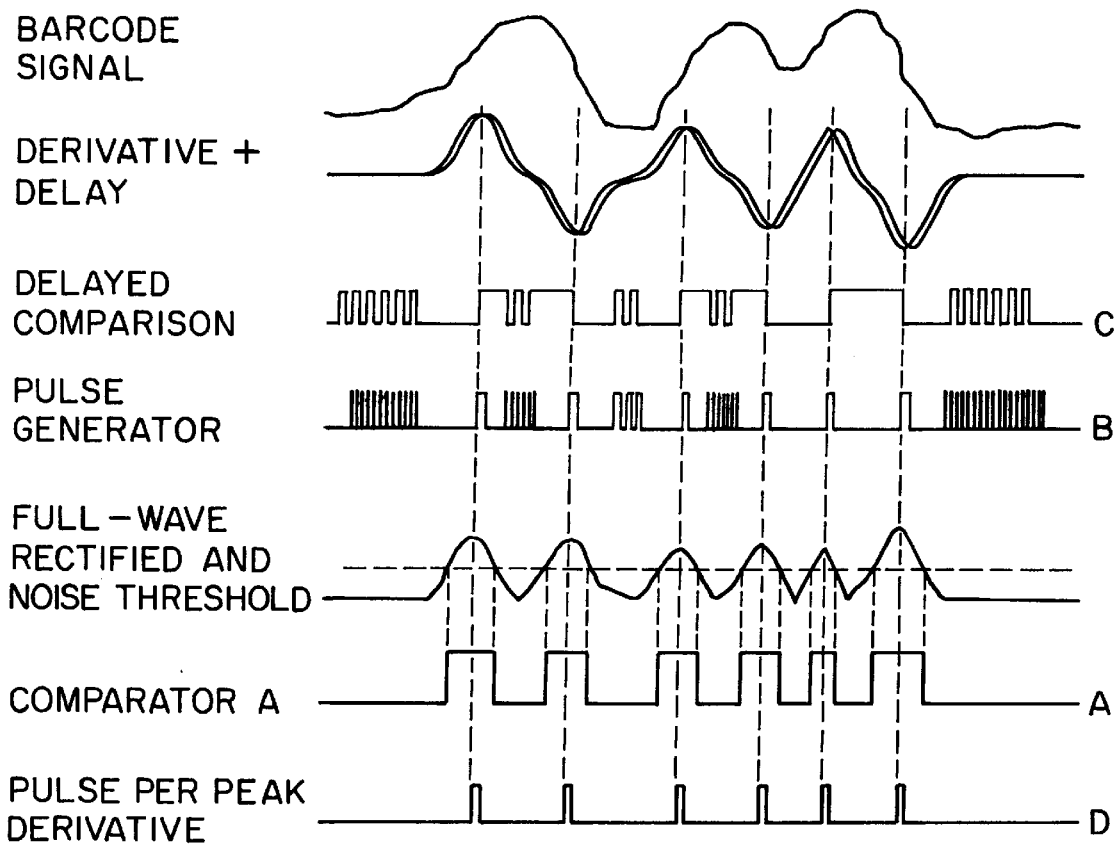
FIG. 5 are waveforms at different nodes in the peak locator circuit of FIG. 4.

FIG. 5 discloses the signal patterns occurring at points A through D. Essentially, the output D provides a pulse at each transition of the delayed derivative signal and corresponds to the time location of the peak heights of a full or half-wave rectified first derivative signal.

Figure 6:
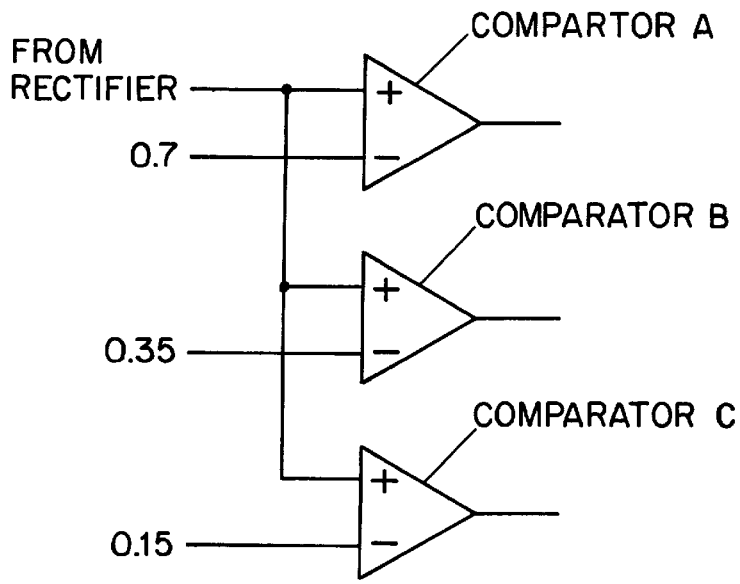
FIG. 6 is a circuit diagram of a level quantizer included in the circuit of FIG. 2.
Figure 9:
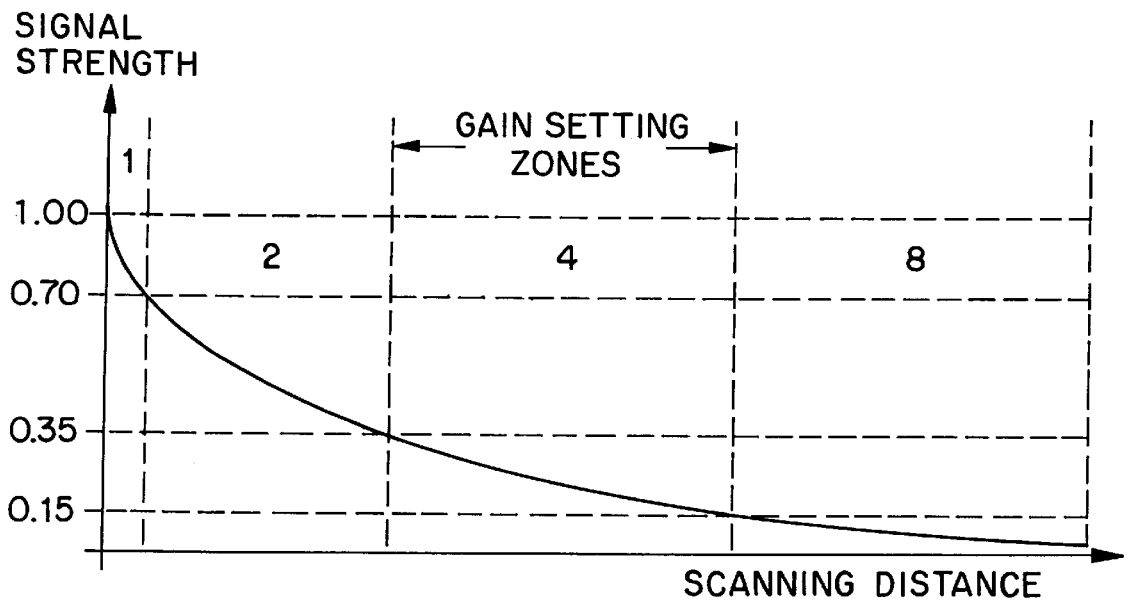
FIG. 9 is a graph of AGC outputs for each gain setting and input signal range.
Figure 7:
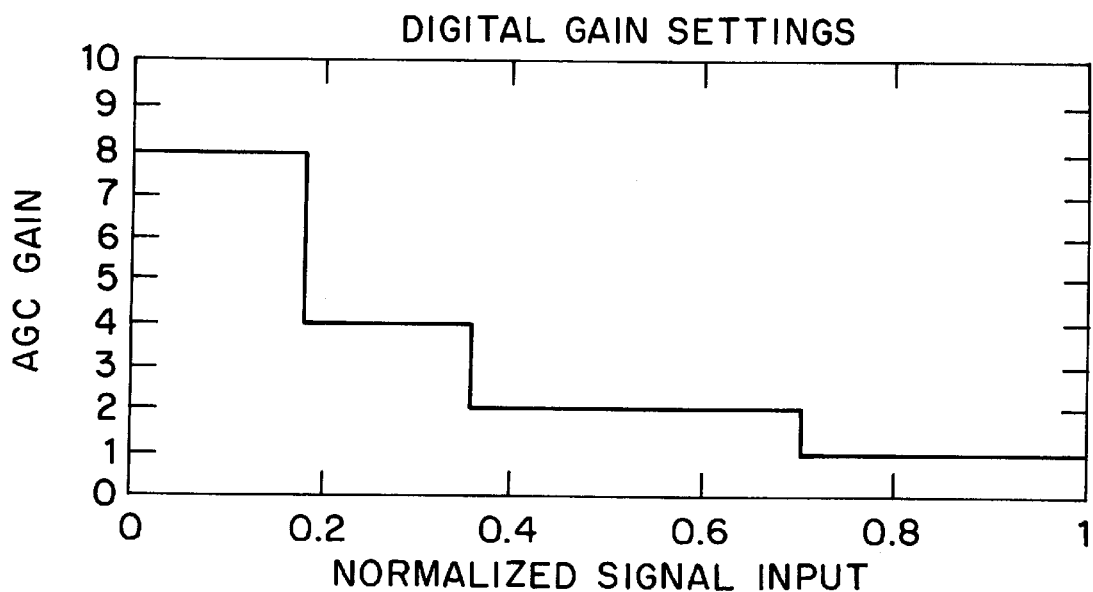
FIG. 7 is a graph of AGC gain settings for the digital voltage amplifier of FIG. 2 for various input signal ranges.
Figure 8:
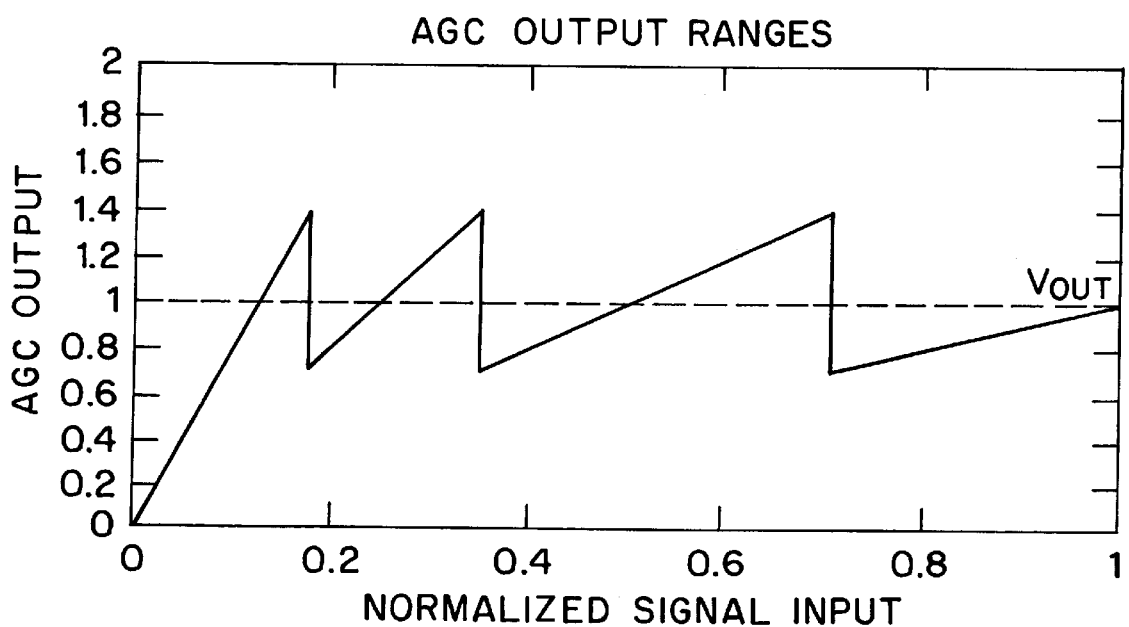
FIG. 8 is a graph of AGC output for the digital voltage amplifier of FIG. 2 for various gain settings and input signal ranges.

The level quantizer 42 (see FIG. 2) sets the gain of the VCA 14 as the bar code signal strength rises and falls. The quantizer may be generalized as an A/D converter. However, to lower costs, a window comparator as shown in FIG. 6 will suffice with fewer quantization levels. The number of quantization levels depends on the dynamic range of the bar code signal. The accuracy required of an automatic gain control application for bar code scanners requires only a few levels. For example, a typical number may be four as shown in FIG. 7. As the input signal falls in the preset ranges detected by the comparators, the smart AGC system will set the VCA 14 gain to the appropriate level. For example, if only four gain settings are required as shown in FIG. 7, then the output of the AGC will be maintained within the voltage margin shown in FIG. 8 as the input signal strength varies. If the VCA 14 is implemented with a digitally controlled attenuator in series with a DVCA, fractional gains will be possible. This will further reduce the margin that the output voltage will be maintained. In addition, the more gain settings each amplifier or attenuator has, the more resolution the system will have when amplifying low input signals. That is, rather than the output signal following the input signal for low input values as shown in FIG. 9, the output voltage will be maintained within the required margins. This is because more gain settings will become available.

Returning to FIG. 2, the processor 26 sets the gain for the VCA 14 based upon the setting of the latch 34, the time location of the peak height of the first of the full or half-wave rectified first derivative signal provided by the peak locator circuit 40 and the quantization level provided by the quantizer 42. The processor 26 provides for a constant gain for the VCA 14 during a scan duration. The beginning of a scan is normally flagged by a Start Of Scan (SOS) signal 41 which is derived from the scan motor drive. A short predetermined time before the SOS transition will be used by the processor to calculate the bar code signal strength. Since the signal strength does not change rapidly between scans, the gain of the next scan will be based on the signal strength of the current scan. A fixed signal gain throughout the entire scan prevents gain modulation at frequencies lower than the time constant of the signal strength indicator, and is more tolerant to noise from ambient light and other low frequency noise sources.

The signal strength is derived from the peak heights of the full or half-wave rectified first derivative signal. By doing so, the processor will avoid having to sample the entire signal. The limited sampling lowers costs and the computing requirements of the processor. For any bar code signal, an average of the peak heights of the full or half-wave rectified derivative signal above a noise threshold is all that is required for determining the overall signal strength. A full wave rectifier may be used in order to increase the accuracy of the calculation. The AGC system is usually tolerant to small variations of the signal strength. Therefore, a single gain setting will be enough for a certain scanning range before the next gain will be needed as shown in FIG. 9. The desired scanning distance will determine the resolution of the VCA 14. The voltage margins within which the AGC must maintain the output signal will determine the accuracy required of the signal strength calculation, and whether or not a full wave rectifier will be needed to improve the accuracy. The signal strength varies as a function of the inverse scanning distance. Therefore the VCA 14 may need only a few gain settings in order to cover the entire scanning range. Such a digitally controlled logarithmic gain amplifier is the PGA 205 made by Burr-Brown. The PGA 205 has settings of 1, 2, 4, and 8. Other digitally controlled gain amplifiers are also available and others can be constructed from operational amplifiers and multiplying digital/analog converters as described in numerous semiconductor data books.

Figure 10:
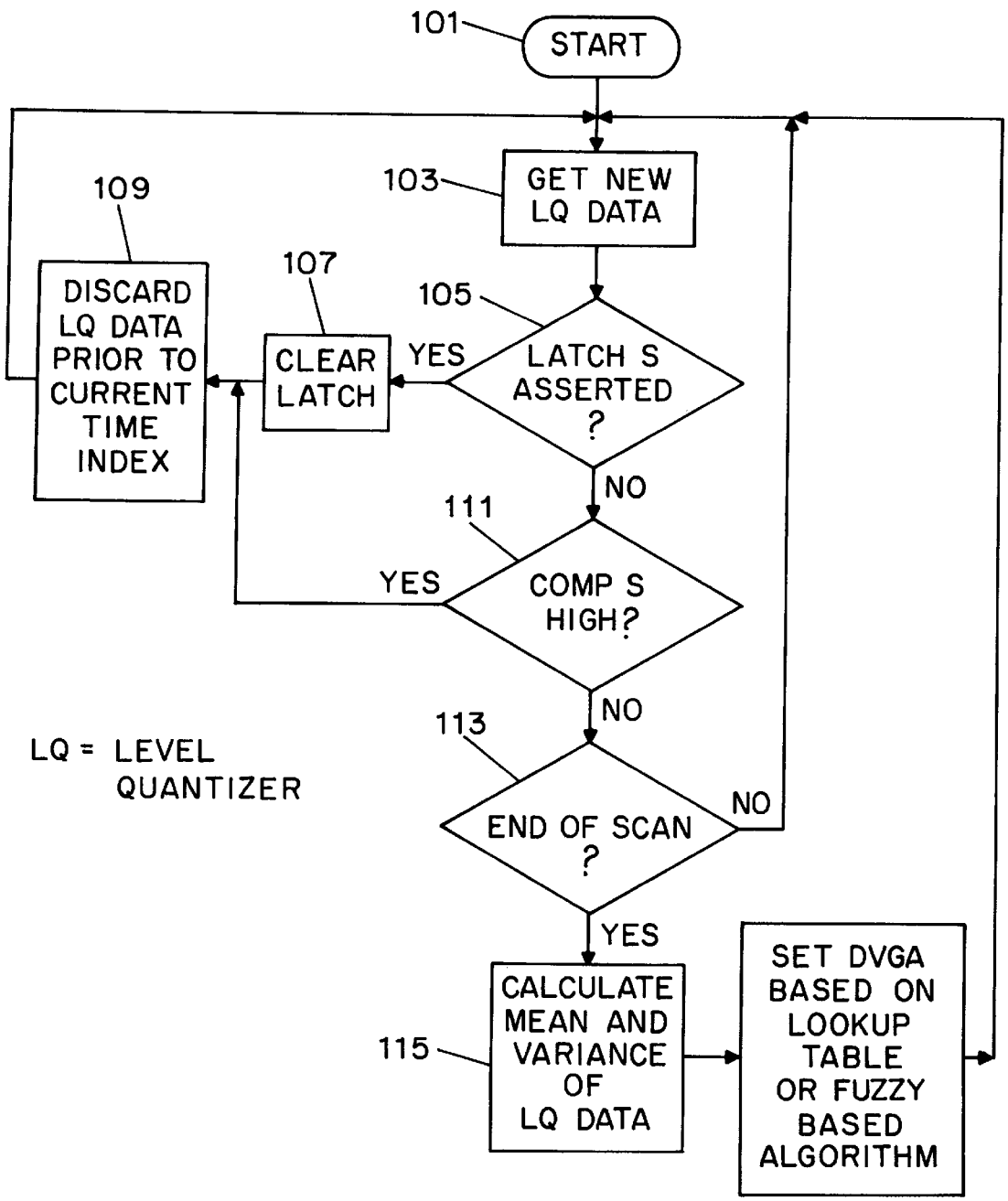
FIG. 10 is a flow diagram for the operation of the AGC circuit in FIG. 2.

FIG. 10 describes the operation of the smart AGC system shown in FIG. 2. As peak derivative heights above a noise threshold are captured by the processor 26, a histogram is constructed. At the end of the scan, the mean and variance of this histogram will help determine the required gain setting. For example, if the mean is 0.5 volts and the variance is small (in agreement with the mean), than the gain will be set to 2 as shown in FIG. 9. If the variance is large, then the signal may have been noisy or out of focus and the last gain would be repeated In FIG. 10, the smart AGC process is entered into a standard start step 101. An operation 103 obtains the latest level quantizing data from the quantizer 42 and provides an input to an operation 105 which determines whether the latch S has been asserted in the first signal path 22. If a "yes" condition exists, a specular glitch 11 (see FIG. 3) has been detected by the first signal path and the latch is cleared in an operation 107. After which the level quantizing data prior to the current time index of the pulse generator is discarded in an operation 109 and the AGC system returns to the operation 103.

A "no" condition for the operation 105 initiates an operation 111 to determine whether the comparator 32 is in a high state indicative of a continuing specular reflection or noise condition. A "yes" condition initiates the operation 109 to discard the level quantizing data and return to the operation 103. A "no" condition for the operation 111 initiates an end of scan operation 113. It should be noted that the time between successive scans is not fixed, but may be varied according to the processor operation. In the operation 113, a "no" condition returns the AGC setting process to the operation 103. A "yes" condition initiates an operation 115 in which the processor 26 calculates the mean and variance of the data provided by the level quantizer 42 and provides an input to an operation 117 in which the processor 26 sets the VCA 14 voltage level based on a look up table or a fuzzy based algorithm, after which the process returns to the operation 103.

Essentially the algorithm in FIG. 10 finds the last segment of non-corrupted scan data as the data is being collected in real time. From this data, the mean and variance of the peak heights are calculated and sent either to a look up table based algorithm to set the gain or a fuzzy logic based algorithm that sets the gain of the VCA. As indicated before, the comparator 32 detects if the bar code signal is still being corrupted after the latch 34 has been cleared. Latch 34 is required for registering very short specular or glitch events that may be missed by a slow processor that is polling its input.

If specular reflection or noise glitches are not present in the current scan or part of the current scan, a gain setting algorithm may be used. For AGC systems that can afford more resolution of the input signal strength, a fuzzy logic based algorithm may be useful. However, for purposes of an example, the resolution of FIG. 6 is assumed. The mean and variance may be classified in the fuzzy sets such as {High, Normal, Low, Minimum}. Some simple fuzzy rules may be used, as follows:

1. If the variance is Small to Medium and the peaks are Large, then the VCA gain is set Low.
2. If the variance is Small to Medium and the peaks are Medium, then the VCA gain is set to Normal.
3. If the variance is Small to Medium and the peaks are Small, then the VCA gain is set to High.
4. If the variance is Large, then the gain is maintained at the previous setting.

The membership functions may be optimized depending on the resolution of the AGC system. For bar code scanners, simple trapezoidal and triangular membership functions will suffice. For defuzzification, the centroid method may be used.

In summary, an intelligent AGC system is disclosed for dealing with the shortcomings of prior art AGC implementations for bar code scanners. The intelligent or smart AGC systems maintain a constant VCA gain throughout a single scan and maintains the VCA output within a constant voltage window as the input signal strength changes from scan to scan. The AGC system is also immune to noise and specular reflection that often severely degrades the decoding performance of omni-directional scanners in particular. The present AGC system is implemented with programmable logic and a digitally controlled VGA and may utilize fuzzy logic as part of the processor means.

While the present invention has been described in a preferred embodiment, various modifications may be made without departing from the spirit and scope of the invention as defined in the claims in which:

I claim:

1. A bar code scanner including intelligent automatic gain control which maintains a constant signal level and does not delay a decoder in identifying indicia when noise or specular reflection occur during a scan period comprising:

a. a light detector for receiving light reflected from an indicia during the scan period and in response thereto generating an electrical signal;

b. a processor responsive to a start of next scan period signal and the electrical signal for generating a constant signal level during the scan period and determining the automatic gain control signal level prior to the next scan period according to the characteristics of the electrical signal, the processor comprising
   i) a second detector for detecting noise or specular reflection in the electrical signal and providing an output when noise or specular reflection has occurred in the electrical signal;
   ii) a generator for generating a first derivative of the electrical signal and providing an output indicative of an automatic gain control signal level for the next scan period; and c. an amplifier coupled to the processor and providing a decoder a current automatic gain control signal level for indicia identification purposes when a specular reflection or noise has occurred in a current scan period or providing the decoder an automatic gain control signal level from the processor for the next scan period if a specular reflection or noise has not occurred in the current scan period.

2. The bar code scanner of claim 1 wherein the processor includes fuzzy logic means.

3. The bar code scanner of claim 1 wherein the processor is programmable logic array.

4. A bar code scanner including intelligent automatic gain control which maintains a constant signal level and does not delay a decoder in identifying indicia when noise or specular reflection occur during a scan period, said bar code scanner comprising:

a. a light detector for receiving light reflected from an indicia during the scan period and in response thereto generating an electrical signal;

b. a processor responsive to a start of next scan period signal and the electrical signal for generating a constant signal level during the scan period and determining the automatic gain control signal level prior to the next scan period according to the characteristics of the electrical signal, the processor comprising
   i) a second detector for detecting noise or specular reflection in the electrical signal and providing an output when noise or specular reflection has occurred in the electrical signal, said second detector including
      (a) an inverter responsive to the electrical signal and providing an output signal;
      (b) a comparator responsive to the inverter output signal and to a specular/noise threshold signal level to provide an output to a latch when the inverter output signal exceeds the specular/noise threshold signal level; and
      (c) means for discarding the automatic gain control signal level determined by the processor for the next scan period and providing the current automatic gain control signal level for the next scan period;
   ii) a generator for generating a first derivative of the electrical signal and providing an output indicative of an automatic gain control signal level for the next scan period; and
   iii) means for setting the signal level for the next scan period according to a scan distance between the bar code scanner and the indicia; and c. an amplifier coupled to the processor and providing a decoder a current automatic gain control signal level for indicia identification purposes when a specular reflection or noise has occurred in a current scan period or providing the decoder an automatic gain control signal level from the processor for the next scan period if a specular reflection or noise has not occurred in the current scan period.

5. A bar code scanner including intelligent automatic gain control which maintains a constant signal level and does not delay a decoder in identifying indicia when noise or specular reflection occur during a scan period, said bar code scanner comprising:
- a. a light detector for receiving light reflected from an indicia during the scan period and in response thereto generating an electrical signal;
- b. a processor responsive to a start of next scan period signal and the electrical signal for generating a constant signal level during the scan period and determining the automatic gain control signal level prior to the next scan period according to the characteristics of the electrical signal, the processor comprising
  - i) a second detector for detecting noise or specular reflection in the electrical signal and providing an output when noise or specular reflection has occurred in the electrical signal;
  - ii) a generator for generating a first derivative of the electrical signal and providing an output indicative of an automatic gain control signal level for the next scan period, the generator including
    - (a) a rectifier for rectifying the first derivative signal and providing an input to a level quantizer and to a signal peak detector, wherein the level quantizer provides a signal level to the processor according to the signal level of the rectified first derivative signal for the next scan period; and
    - (b) the signal peak detector responsive to the first derivative signal; a threshold level, and the rectifier output to provide a pulse output to the processor corresponding to the time location of the peak height of the rectified first derivative signal during the current scan period; and
  - iii) means for setting the signal level for the next scan period according to a scan distance between the bar code scanner and the indicia; and
- c. an amplifier coupled to the processor and providing a decoder a current automatic gain control signal level for indicia identification purposes when a specular reflection or noise has occurred in a current scan period or providing the decoder an automatic gain control signal level from the processor for the next scan period if a specular reflection or noise has not occurred in the current scan period.

6. In a bar code scanner including a processor for intelligent automatic gain control, a method which maintains a constant signal level and does not delay a decoder in identifying indicia when noise or specular reflection occur during a scan period, said method comprising the steps of:
- a) receiving light reflected in a light detector from an indicia during the scan period and in response thereto generating an electrical signal;
- b) generating a constant signal level during the scan period using a processor responsive to a start of next scan period signal and the electrical signal;
- c) determining the automatic gain control signal level prior to the next scan period according to the characteristics of the electrical signal; and
- d) providing the determined automatic gain control signal level to an amplifier for the next scan period if the electrical signal does not contain specular reflection or noise component above a selected threshold.

7. The method of claim 6 further comprising the steps of:
- i) generating a first derivative of the electrical signal and providing an output to the processor indicative of an automatic gain control signal level for the next scan period; and
- ii) setting the signal level for the next scan period according to a scan distance between the bar code scanner and the indicia using the processor.

8. In a bar code scanner including a processor for intelligent automatic gain control, a method which maintains a constant signal level and does not delay a decoder in identifying indicia when noise or specular reflection occur during a scan period, comprising the steps of:
- a. receiving light reflected in a light detector from an indicia during the scan period and in response thereto generating an electrical signal;
- b. generating a constant signal level during the scan period using a processor responsive to a start of next scan period signal and the electrical signal;
- c. generating a first derivative of the electrical signal and providing an output to the processor indicative of an automatic gain control signal level for the next scan period;
- d. providing an input to a latch and the processor when an inverter output signal exceeds a specular/noise threshold signal level;
- e. determining the automatic gain control signal level prior to the next scan period according to the characteristics of the electrical signal;
- f. setting the signal level for the next scan period according to a scan distance between the bar code scanner and the indicia using the processor; and
- g. providing the automatic gain control signal level to an amplifier for the next scan period.

9. The method of claim 8 further comprising the step of:
- i) using a comparator responsive to the inverter output signal and to the specular/noise threshold signal level to provide the input to the latch.

10. The method of claim 8 further comprising the step of:
- i) rectifying the first derivative signal and providing an input to a level quantizer and to a signal peak detector;
- ii) providing an AGC signal level to the processor according to the signal level of the rectified first derivative signal for the next scan period;
- iii) providing a pulse output to the logic means corresponding to the time location of the peak height of the rectified first derivative signal during the current scan period using the signal peak detector responsive to the first derivative signal; a threshold level, and the rectifier output to the level quantizer.

* * * * *